United States Patent
Lavanant et al.

(10) Patent No.: US 12,514,279 B2
(45) Date of Patent: Jan. 6, 2026

(54) MODIFIED AEROSOL-GENERATING ELEMENT FOR USE IN AN AEROSOL-GENERATING ARTICLE OR SYSTEM

(71) Applicant: Philip Morris Products S.A., Neuchatel (CH)

(72) Inventors: Laurent Lavanant, Neuchatel (CH); Ping Li, Neuchatel (CH); Gisele Ongmayeb, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 643 days.

(21) Appl. No.: 17/773,810

(22) PCT Filed: Oct. 29, 2020

(86) PCT No.: PCT/EP2020/080459
§ 371 (c)(1),
(2) Date: May 2, 2022

(87) PCT Pub. No.: WO2021/089414
PCT Pub. Date: May 14, 2021

(65) Prior Publication Data
US 2022/0369692 A1    Nov. 24, 2022

(30) Foreign Application Priority Data

Nov. 4, 2019    (EP) .................................... 19206999

(51) Int. Cl.
*A24B 15/28*    (2006.01)
*A24B 15/30*    (2006.01)
*A24F 40/40*    (2020.01)

(52) U.S. Cl.
CPC .......... *A24B 15/283* (2013.01); *A24B 15/303* (2013.01); *A24F 40/40* (2020.01)

(58) Field of Classification Search
CPC ...... A24F 40/40; A24B 15/283; A24B 15/303
See application file for complete search history.

(56) References Cited

U.S. PATENT DOCUMENTS

| 5,240,016 A | 8/1993 | Nichols et al. |
| 2006/0144412 A1* | 7/2006 | Mishra .................. A24B 15/283 131/337 |
| 2015/0335070 A1 | 11/2015 | Sears et al. |
| 2016/0295909 A1 | 10/2016 | Besso et al. |
| 2018/0014576 A1 | 1/2018 | White |
| 2018/0029782 A1 | 2/2018 | Zuber et al. |
| 2018/0352862 A1 | 12/2018 | Mironov et al. |
| 2021/0015144 A1 | 1/2021 | Capelli et al. |
| 2021/0085666 A1* | 3/2021 | Capelli ................ A24B 15/403 |

FOREIGN PATENT DOCUMENTS

| CN | 1870913 A | 11/2006 |
| CN | 104824850 A | 8/2015 |
| CN | 107126411 A | 9/2017 |
| CN | 107846963 A | 3/2018 |
| EP | 0 509 657 A1 | 10/1992 |
| EP | 3 104 718 | 12/2016 |
| EP | 3 250 061 | 12/2017 |
| JP | 2013-523087 A | 6/2013 |
| RU | 2 637 980 C2 | 12/2017 |
| WO | WO 2011/101164 A1 | 8/2011 |
| WO | WO 2012/164009 A2 | 12/2012 |
| WO | WO 2013/068304 A1 | 5/2013 |
| WO | WO 2015/123422 A1 | 8/2015 |
| WO | WO 2016/069876 A1 | 5/2016 |
| WO | WO 2016/120344 A2 | 8/2016 |
| WO | WO 2018/019543 A1 | 2/2018 |
| WO | WO 2018/234505 A1 | 12/2018 |
| WO | WO 2019/086859 A1 | 5/2019 |
| WO | WO 2019/086860 A1 | 5/2019 |
| WO | WO 2019/135618 A1 | 7/2019 |
| WO | WO 2019/193208 A1 | 10/2019 |
| WO | WO 2019/193210 A1 | 10/2019 |

(Continued)

OTHER PUBLICATIONS

International Search Report and Written Opinion mailed on Feb. 5, 2021 in PCT/EP2020/080459 filed on Oct. 29, 2020, (total 9 pages).

(Continued)

*Primary Examiner* — Michael H. Wilson
*Assistant Examiner* — Jennifer A Kessie
(74) *Attorney, Agent, or Firm* — Oblon, McClelland, Maier & Neustadt, L.L.P.

(57) ABSTRACT

An aerosol-generating element for an aerosol-generating article or system is provided, the element including: a solid continuous matrix structure; and an aerosol-generating formulation dispersed within the structure, in which the formulation is trapped within the structure and releasable from the structure upon heating of the element, in which the structure is an alginate matrix, in which the formulation consists of: nicotine from 1% by weight to 4% by weight of a total weight of the element, glycerin from 60% by weight to 80% by weight of the total weight of the element, a carboxylic acid from 0.5% by weight to 4% by weight of the total weight of the element, and balance water, in which the formulation dispersed within the structure is at least about 80% by weight of a total weight of the element, and in which the element includes less than 15% by weight of water.

9 Claims, No Drawings

(56) References Cited

FOREIGN PATENT DOCUMENTS

WO     WO-2019193209 A1 * 10/2019 ........... A24B 15/167
WO     WO 2020/207732 A1    10/2020

OTHER PUBLICATIONS

Chan, E.S. et al., "Prediction models for shape and size of ca-alginate macrobeads produced through extrusion-dripping method," Journal of Colloid and Interface Science, vol. 338, No. 1, Oct. 1, 2009, pp. 63-72.
International Preliminary Report on Patentability mailed on Oct. 27, 2021 in PCT/EP2020/080459 filed on Oct. 29, 2020, (total 13 pages).
Combined Russian Office Action and Search Report issued Feb. 15, 2024 in Russian Patent Application No. 2022115038/03 (with English Translation), 13 pages.
Combined Chinese Office Action and Search Report issued Feb. 27, 2023 in Chinese Patent Application No. 202080075798.X (with English Translation), 15 pages.
Extended European Search Report issued May 13, 2020 in European Patent Application No. 19206999.5, 8 pages.
Japanese Office Action issued Nov. 5, 2024 in Japanese Patent Application No. 2022-524987 (with English Translation), 5 pages.

* cited by examiner

MODIFIED AEROSOL-GENERATING ELEMENT FOR USE IN AN AEROSOL-GENERATING ARTICLE OR SYSTEM

The present invention relates to an aerosol-generating element which finds particular use in an aerosol-generating article or system. The present invention further relates to an aerosol-generating article or system comprising such an aerosol-generating element.

Aerosol-generating articles in which an aerosol-generating substrate, such as a tobacco-containing substrate, is heated rather than combusted, are known in the art. Typically in such articles an aerosol is generated by the transfer of heat from a heat source to a physically separate aerosol-generating substrate or material, which may be located in contact with, within, around, or downstream of the heat source. During use of the aerosol-generating article, volatile compounds are released from the aerosol-generating substrate by heat transfer from the heat source and are entrained in air drawn through the aerosol-generating article. As the released compounds cool, they condense to form an aerosol.

A number of prior art documents disclose aerosol-generating devices for consuming aerosol-generating articles. Such devices include, for example, electrically heated aerosol-generating devices in which an aerosol is generated by the transfer of heat from one or more electrical heater elements of the aerosol-generating device to the aerosol-generating substrate of a heated aerosol-generating article.

Substrates for heated aerosol-generating articles have, in the past, often been produced using randomly oriented shreds, strands, or strips of tobacco material. As an alternative, rods for heated aerosol-generating articles formed from gathered sheets of tobacco material have been disclosed, by way of example, in international patent application WO 2012/164009.

International patent application WO 2011/101164 discloses alternative rods for heated aerosol-generating articles formed from strands of homogenised tobacco material, which may be formed by casting, rolling, calendering or extruding a mixture comprising particulate tobacco and at least one aerosol former to form a sheet of homogenised tobacco material. In alternative embodiments, the rods of WO 2011/101164 may be formed from strands of homogenised tobacco material obtained by extruding a mixture comprising particulate tobacco and at least one aerosol former to form continuous lengths of homogenised tobacco material.

Substrates for heated aerosol-generating articles typically further comprise an aerosol former, that is, a compound or mixture of compounds that, in use, facilitates formation of the aerosol and that preferably is substantially resistant to thermal degradation at the operating temperature of the aerosol-generating article. Examples of suitable aerosol-formers include, but are not limited to: polyhydric alcohols, such as propylene glycol, triethylene glycol, 1,3-butanediol and glycerin; esters of polyhydric alcohols, such as glycerol mono-, di- or triacetate; and aliphatic esters of mono-, di- or polycarboxylic acids, such as dimethyl dodecanedioate and dimethyl tetradecanedioate.

Alternative forms of substrates comprising nicotine have also been disclosed. By way of example, liquid nicotine compositions, often referred to as e-liquids, have been proposed. These liquid compositions may, for example, be heated by a coiled electrically resistive filament of an aerosol-generating device.

Substrates of this type may require particular care in the manufacture of the containers holding the liquid composition in order to prevent undesirable leakages.

It has been previously proposed to provide an encapsulated nicotine formulation for use as an aerosol-generating substrate. However, the encapsulation of nicotine formulations has been found to be challenging. One of the reasons for this is the preference for hydrophilic aerosol formers, such as glycerin and propylene glycol, in the nicotine formulation, which makes it difficult to use many of the commonly used encapsulation materials, which are also hydrophilic. With existing encapsulation techniques, it has generally been found that such a high level of the hydrophilic encapsulation material is required in order to produce a stable product that an insufficient payload of the nicotine formulation is provided.

Whilst hydrophobic encapsulation materials are available, such materials often need to be processed at relatively high temperature, which risks the degradation of the nicotine formulation during manufacture. During use, the temperatures required to generate an aerosol from the nicotine formulation may be sufficiently high to cause degradation of the hydrophobic encapsulation material. This may result in the release of undesirable compounds into the resultant aerosol, which may have an adverse impact on the sensory profile of the aerosol.

It has also been proposed to provide a gel composition comprising nicotine that is adapted to generate a nicotine-containing aerosol upon heating. By way of example, WO 2018/019543 discloses a thermoreversible gel composition, that is, a gel that becomes fluid when heated to a melting temperature and sets into a gel again at a gelation temperature. WO 2018/019543 discloses the provision of such a gel within a housing of a cartridge. The cartridge can be disposed of and replaced when the gel has been consumed. In order for the gel composition to generate a satisfactory amount of aerosol during use, it is desirable for the gel composition to include a significant amount of an aerosol-former, such as glycerol. However, due to the plasticising qualities of glycerol, it has been difficult to provide a gel composition that is capable of providing a good aerosol delivery during use and, at the same time, geometrically stable, that is, a gel composition that does not undergo a significant volume loss as it solidifies and settles into film form.

Thus, it would be desirable to provide an alternative, novel encapsulated aerosol-generating formulation, such as for example an aerosol-generating element encapsulating a nicotine-containing formulation, which provides an improved encapsulated substrate having increased stability and minimal leakage of the aerosol-generating formulation.

It would also be desirable to provide such an aerosol-generating element that is easy to handle such as to facilitate the manufacturing and packaging of aerosol-generating articles comprising one or more of the aerosol-generating element. It would also be desirable to provide such an encapsulated aerosol-generating formulation with minimal encapsulating structure, so as to provide an efficient aerosol delivery, particularly when heated to a temperature in the range from about 150 degrees Celsius to about 350 degrees Celsius.

The present disclosure relates to an aerosol-generating element for use in an aerosol-generating article or system. The aerosol-generating element may comprise a solid continuous matrix structure and an aerosol-generating formulation dispersed within the solid continuous matrix structure. The aerosol-generating formulation may be trapped within the solid continuous matrix structure and releasable from the solid continuous matrix structure upon heating of the aerosol-generating element. The solid continuous matrix structure may be a polymer matrix comprising one or more matrix-forming polymers. The aerosol-generating formulation dispersed within the solid continuous matrix structure may comprise at least one alkaloid or cannabinoid compound. The aerosol-generating formulation dispersed within the solid continuous matrix structure may comprise a polyhydric alcohol. The aerosol-generating formulation dispersed within the solid continuous matrix structure may account for at least about 80 percent by weight of a total weight of the aerosol-generating element.

Further, the present disclosure relates to an aerosol-generating article comprising one or more aerosol-generating elements as described above. In addition, the present disclosure relates to an aerosol-generating system comprising one or more aerosol-generating elements or an aerosol-generating article as described above and an electrically operated aerosol-generating device comprising a heating element and a heating chamber configured to receive the aerosol-generating element or article so that the aerosol-generating element is heated in the heating chamber by the heating element.

According to the present invention there is provided an aerosol-generating element for use in an aerosol-generating article or system, the aerosol-generating element comprising: a solid continuous matrix structure; and an aerosol-generating formulation dispersed within the solid continuous matrix structure, wherein the aerosol-generating formulation is trapped within the solid continuous matrix structure and releasable from the solid continuous matrix structure upon heating of the aerosol-generating element; wherein the solid continuous matrix structure is a polymer matrix comprising one or more matrix-forming polymers, and wherein the aerosol-generating formulation dispersed within the solid continuous matrix structure comprises at least one alkaloid or cannabinoid compound and a polyhydric alcohol, wherein the aerosol-generating formulation dispersed within the solid continuous matrix structure accounts for at least about 80 percent by weight of a total weight of the aerosol-generating element.

The term "aerosol-generating article" is used herein with reference to the invention to describe an article wherein an aerosol-generating substrate is heated to produce and deliver an aerosol to a consumer. As used herein, the term "aerosol-generating substrate" denotes a substrate capable of releasing volatile compounds upon heating to generate an aerosol.

The term "aerosol-generating element" is used herein with reference to the invention to describe a discrete, self-standing aerosol-generating substrate element capable of releasing volatile compounds upon heating to generate an aerosol. An aerosol-generating element in accordance with the present invention may find use as an aerosol-generating substrate of an aerosol-generating article.

The aerosol generated from the aerosol-generating formulation of aerosol-generating elements described herein is a dispersion of solid particles or liquid droplets (or a combination of solid particles and liquid droplets) in a gas. The aerosol may be visible or invisible and may include vapours of substances that are ordinarily liquid or solid at room temperature as well as solid particles or liquid droplets or a combination of solid particles and liquid droplets.

A conventional cigarette is lit when a user applies a source of ignition to one end of the cigarette and draws air through the other end. The localised heat provided by the flame and the oxygen in the air drawn through the cigarette causes the end of the cigarette to ignite, and the resulting combustion generates an inhalable smoke. By contrast, in heated aerosol-generating articles, an aerosol is generated by heating a flavour generating substrate, such as, for example, a tobacco-based substrate or a substrate containing an aerosol-former and a flavouring. Known heated aerosol-generating articles include, for example, electrically heated aerosol-generating articles and aerosol-generating articles in which an aerosol is generated by the transfer of heat from a combustible fuel element or heat source to a physically separate aerosol forming material.

For example, aerosol-generating articles according to the invention may find particular application in aerosol-generating systems comprising an electrically heated aerosol-generating device having an internal heater which is adapted to supply heat to one or more discrete aerosol-generating substrate elements. As used herein with reference to the present invention, the term "aerosol-generating device" is used to described a device comprising a heater element that interacts with one or more aerosol-generating elements in accordance with the invention to produce an aerosol. During use, volatile compounds are released from the aerosol-generating element or elements by heat transfer and entrained in air drawn through the aerosol-generating article. As the released compounds cool they condense to form an aerosol that is inhaled by the consumer.

Substrates for heated aerosol-generating articles typically comprise an "aerosol former", that is, a compound or mixture of compounds that, in use, facilitates formation of the aerosol, and that preferably is substantially resistant to thermal degradation at the operating temperature of the aerosol-generating article. Examples of suitable aerosol-formers include: polyhydric alcohols, such as propylene glycol, triethylene glycol, 1,3-butanediol and glycerin; esters of polyhydric alcohols, such as glycerol mono-, di- or triacetate; and aliphatic esters of mono-, di- or polycarboxylic acids, such as dimethyl dodecanedioate and dimethyl tetradecanedioate. The polyhydric alcohol in the aerosol-generating article of the invention is also an aerosol former within the meaning set out above.

As used herein with reference to the present invention, the term "aerosol-generating formulation" refers to a formulation comprising a plurality of aerosol-generating formulation components, which upon heating of the aerosol-generating element will volatilise to produce an aerosol.

As used herein with reference to the present invention, the term "matrix-forming polymer" refers to an encapsulation material in the form of a polymer which is capable of producing a three-dimensional polymer matrix as a result of cross-linking when the matrix-forming polymer is brought into contact with a cross-linking solution of multivalent cations. The resultant polymer matrix is capable of trapping and retaining the aerosol-generating formulation within its cross-linked structure. The nature of the cross-linked polymer matrix will be discussed in more detail below.

As briefly described above, in contrast with existing aerosol-generating elements, an aerosol-generating element in accordance with the present invention comprises a solid continuous matrix structure and an aerosol-generating formulation dispersed within the solid continuous matrix structure. In more detail, the aerosol-generating formulation is trapped within the solid continuous matrix structure and can be released from the solid continuous matrix structure upon heating of the aerosol-generating element to a predetermined temperature.

Without wishing to be bound by theory, it is understood that in an aerosol-generating element in accordance with the present invention a three-dimensional polymeric matrix structure is formed by cross-linking, and aerosol-generating formulation is retained within the polymeric matrix structure. This is, in particular, in contrast with existing core/shell structures wherein a content of the core is released upon rupturing the shell.

In an aerosol-generating element in accordance with the present invention the solid continuous matrix structure is a polymer matrix comprising one or more matrix-forming polymers. Further, the aerosol-generating formulation dispersed within the solid continuous matrix structure accounts for at least about 80 percent by weight of a total weight of the aerosol-generating element.

Advantageously, the invention provides an aerosol-generating formulation in encapsulated form that has a significantly lower content of encapsulation material (corresponding to the one or more matrix-forming polymers of the solid continuous matrix structure) compared with previously available substrates. As such, the levels of the aerosol-generating formulation components, such as the alkaloid or cannabinoid and the polyhydric alcohol, can advantageously be maximised within the aerosol-generating element. Further, the reduction in the proportion of encapsulation material required enables a more efficient generation of aerosol upon heating, since less of the heat supplied to the aerosol-generating element is used for increasing the temperature of the encapsulation material.

The polymer-based solid continuous matrix of aerosol-generating articles in accordance with the present invention provides an inert encapsulation structure for retaining and immobilising the aerosol-generating formulation, which is stable upon heating of the aerosol-generating element during use. The inventors have found that, when heated to temperatures in the range from 150 degrees Celsius to 350 degrees Celsius, aerosol-generating elements in accordance with the present invention release an aerosol as they undergo a significant weight loss. This weight loss is not, however, accompanied by an equally significant volume loss. Without wishing to be bound by theory, it is understood that, upon heating, components of the aerosol-generating formulation originally dispersed and trapped within the solid continuous matrix structure are substantially vaporised and released. On the other hand, components of the solid continuous matrix are substantially unaffected and the solid continuous matrix only partially shrinks while essentially retaining its 3D structure. As such, the encapsulation of the aerosol-generating formulation within the polymer-based matrix advantageously provides minimal or no adverse effects on the sensory profile of the aerosol generated upon heating.

The aerosol-generating element of the present invention has been found to advantageously provide a controlled delivery of aerosol. Furthermore, the aerosol delivery profile can be readily adjusted by adjusting parameters of the aerosol-generating element such as the size, shape, structure and formulation of the aerosol-generating element.

The invention advantageously provides an aerosol-generating element that is in the form of a discrete, self-standing solid object which is sufficiently stable and robust that it can readily be processed and introduced into an aerosol-generating article using existing methods and techniques.

Further, aerosol-generating elements in accordance with the present invention can be prepared by a cost-effective method that can be carried out with existing equipment, as will become apparent from the following description thereof. In addition, aerosol-generating elements in accordance with the present invention can be prepared by a method that can be easily incorporated into existing production lines for the manufacture of aerosol-generating articles.

Aerosol-generating elements in accordance with the present invention may be prepared from a matrix precursor solution and components of an aerosol-generating formulation. By way of example, in a method of manufacturing an aerosol-generating element in accordance with the invention, a matrix precursor solution may be provided that comprises a matrix-forming polymer in water. Preferably, the matrix polymer solution comprises at least about 35 percent by weight of water, more preferably at least about 40 percent by weight of water. This level of water ensures that the matrix-forming polymer is sufficiently dissolved so that a homogeneous solution is provided.

The matrix-forming polymer may be a single polymer or a combination of two or more polymers, wherein the one or more polymers are capable of forming a cross-linked matrix through an ionotropic gelation mechanism in a cross-linking solution of multivalent cations. The cross-linking of the matrix-forming polymer is achieved through reaction of the polymer with multivalent cations in the cross-linking solution, which form salt bridges to cross-link the polymer molecules. Suitable matrix-forming polymers would be known to the skilled person, and include, but are not limited to, alginate, pectin, hydroxyethylmethacryate (HEMA), N-(2-hydroxy propyl)methacrylate (HPMA), N-vinyl-2-pyrrolidone (NVP), N-isopropylacrylamide (NIPAMM), vinyl acetate (VAc), acrylic acid (AA), methacrylic acid (MAA), polyethylene glycol acrylate/methacrylate (PEGA/PEGMA) and polyethylene glycol diacrylate/dimethacrylate, (PEGDA/PEGDMA).

Preferably, the matrix-forming polymer comprises one or more polysaccharides, such as alginate or pectin, or a combination thereof. Polysaccharides are particularly suitable for use in the present invention, since they can be made water insoluble and heat stable through cross-linking, and are tasteless. There is therefore no adverse impact on the sensory properties of the aerosol generated from the aerosol-generating element. Alternative matrix-forming polymers suitable for use in methods according to the invention include but are not limited to chitosan, fibrin, collagen, gelatin, hyaluronic acid, dextran and combinations thereof.

In preferred embodiments, the matrix-forming polymer is a single polysaccharide. Even more preferably the matrix-forming polymer is alginate. In other words, in such particularly preferred embodiments, the solid continuous matrix structure is an alginate polymer matrix. In a first step, a plurality of aerosol-generating formulation components may be added to the matrix precursor solution to form an aerosol-generating solution, wherein the aerosol-generating formulation components comprise at least one alkaloid or cannabinoid compound and a polyhydric alcohol. As used herein when describing a method of preparing aerosol-generating elements in accordance with the invention, the term "aerosol-generating solution" denotes a solution of the aerosol-generating formulation components and the matrix precursors, in an appropriate solvent.

Polyhydric alcohols suitable for use in the aerosol-generating element include, but are not limited to, propylene glycol, triethylene glycol, 1,3-butanediol, and glycerin. Preferably, in an aerosol-generating element produced in accordance with the invention the polyhydric alcohol is selected from the group consisting of glycerin, propylene glycol, and combinations thereof. In particularly preferred embodiments the polyhydric alcohol is glycerin. Preferably, the alkaloid is selected from the group consisting of: nicotine, anatabine and combinations thereof.

It may be desirable to control the viscosity of aerosol-generating solution. This may include controlling the viscosity of the matrix polymer solution as the aerosol-generating formulation components are added. For example, depending upon the technique used for producing the discrete portion of the aerosol-generating solution in the subsequent step of the method, it may be preferable to provide the aerosol-generating solution with a viscosity within a specific range. Different techniques are likely to be facilitated by different viscosity solutions and an appropriate viscosity should therefore be determined depending upon the technique used. By way of example, when the discrete portion of the aerosol-generating solution is produced in a gravitational dripping process, the viscosity of the solution is preferably retained below about 5000 mPa·s. (milliPascal-seconds). This enables droplets of the aerosol-generating solution to be formed under gravity and also allows the beads to reach a stable shape in the cross-linking solution before the cross-linking hardens the solution and fixes the final shape of the aerosol-generating element.

In certain cases, in order to control the viscosity of the aerosol-generating solution it may be preferably to control the pH of the matrix polymer solution whilst the aerosol-generating formulation components are being added. This is because for some matrix polymer solutions, the pH may affect the viscosity. For example, in embodiments of the invention in which the matrix-forming polymer comprises alginate, it is preferable to retain the pH of the solution above pH4. This is intended to avoid any gelling of the alginate, which may occur at pH levels below pH4, for example, due to hydrogen bonding. Such gelling at a low pH would cause an undesirable increase in the viscosity of the aerosol-generating solution, which would make it difficult to use certain techniques such as gravitational dripping, in order to form the aerosol-generating element.

Alternatively or in addition, the viscosity of the aerosol-generating solution may be controlled by adjusting the concentration of the solution. For example, the proportion of water in the aerosol-generating solution may be adjusted in order to adjust the viscosity. Preferably, the aerosol-generating solution comprises at least about 35 percent by weight of water in order to maintain a suitable viscosity. Particularly preferably, the aerosol-generating solution comprises between about 35 percent by weight and about 65 percent by weight of water. In a second step, a discrete portion of the aerosol-generating solution may be formed. In a third step, the formed discrete portion of the aerosol-generating solution may be added to a cross-linking solution of multivalent cations to cross-link the matrix-forming polymer, thereby forming an aerosol-generating element having a continuous polymer matrix structure and an aerosol-generating formulation comprising the aerosol-generating components dispersed within the continuous polymer matrix. Preferred multivalent cations include calcium, iron, aluminium, manganese, copper, zinc or lanthanum. A particularly preferred salt is calcium chloride.

In certain preferred embodiments of the invention in which the aerosol-generating solution comprises an acid, the calcium salt provided in the cross-linking solution may advantageously be a salt of the same acid. For example, in embodiments in which the aerosol-generating solution comprises lactic acid, the cross-linking solution may advantageously comprise calcium lactate.

Where the aerosol-generating solution comprises nicotine, the acid in the aerosol-generating solution forms a nicotine salt with the nicotine. The use of a calcium salt corresponding to the acid in the aerosol-generating solution therefore provides the same salt in the cross-linking solution as in the aerosol-generating solution. This, in turn, advantageously limits the diffusion of nicotine salts out of the aerosol-generating solution into the cross-linking solution during the cross-linking step. A higher concentration of the nicotine salt can therefore be retained within the aerosol-generating element. Furthermore, any potential waste of the nicotine and acid during the production of the aerosol-generating element can be reduced.

Preferably, the cross-linking solution further comprises a polyhydric alcohol, which is the same as the polyhydric alcohol selected as the aerosol-generating formulation component. The inclusion of the polyhydric alcohol in the cross-linking solution has been found to limit diffusion of the polyhydric alcohol from the aerosol-generating solution into the cross-linking solution during the cross-linking step. This advantageously enables a higher concentration of the polyhydric alcohol to be retained within the aerosol-generating element than has been previously possible.

In a fourth step, the aerosol-generating element may be removed from the cross-linking solution and dried. As described briefly above, in an aerosol-generating element in accordance with the present invention the aerosol-generating formulation dispersed within the solid continuous matrix structure accounts for at least about 80 percent by weight of a total weight of the aerosol-generating element.

More preferably, the aerosol-generating formulation dispersed within the solid continuous matrix structure accounts for at least about 82 percent by weight of a total weight of the aerosol-generating element. Even more preferably, the aerosol-generating formulation dispersed within the solid continuous matrix structure accounts for at least about 84 percent by weight of a total weight of the aerosol-generating element.

In particularly preferred embodiments, the aerosol-generating formulation dispersed within the solid continuous matrix structure accounts for at least about 86 percent by weight of a total weight of the aerosol-generating element. More preferably, the aerosol-generating formulation dispersed within the solid continuous matrix structure accounts for at least about 88 percent by weight of a total weight of the aerosol-generating element. Even more preferably, the aerosol-generating formulation dispersed within the solid continuous matrix structure accounts for at least about 90 percent by weight of a total weight of the aerosol-generating element.

Most preferably, the aerosol-generating formulation dispersed within the solid continuous matrix structure accounts for at least about 92 percent by weight of a total weight of the aerosol-generating element or at least about 93 percent by weight of a total weight of the aerosol-generating element or at least about 94 percent by weight of a total weight of the aerosol-generating element or at least about 95 percent by weight of a total weight of the aerosol-generating element.

In aerosol-generating elements wherein the aerosol-generating formulation accounts for a fraction of the overall weight of the aerosol-generating element within the ranges described above, it is advantageously possible to minimise the portion of heat supplied to the aerosol-generating element during use that is consumed for increasing the temperature of the encapsulation material. As such, a more efficient use of the heat supplied to the aerosol-generating element is made possible, such that the great majority of said heat is effectively employed for releasing the aerosol-formulation components from the solid continuous matrix structure and the generation of an aerosol.

As set out above, in aerosol-generating elements in accordance with the present invention, the solid continuous matrix structure is a polymer matrix comprising one or more matrix-forming polymers. Suitable matrix-forming polymers would be known to the skilled person.

Preferably, the one or more matrix-forming polymer include one or more polysaccharides. More preferably, the one or more matrix-forming polymers include at least one of alginate and pectin. Polysaccharides are particularly suitable for use in the present invention, since they can be made water insoluble and heat stable through cross-linking, and are tasteless. There is therefore no adverse impact on the sensory properties of the aerosol generated from the aerosol-generating element.

In preferred embodiments, the matrix-forming polymer is a single polysaccharide. Even more preferably the matrix-forming polymer is alginate. In other words, in such particularly preferred embodiments, the solid continuous matrix structure is an alginate polymer matrix.

Use of alginate as the sole matrix-forming polymer is preferred because alginate has the ability to promote the rapid formation of insoluble, solid aerosol-generating elements. In more detail, the inventors have found that use of alginate as the sole matrix-forming polymer, particularly in the amounts described below, advantageously provides aerosol-generating elements that are stable and self-supporting and can hold higher concentrations of polyhydric alcohol within the polymer matrix. Further, compared to other formulations, use of alginate as the sole matrix-forming polymer, particularly in the amounts described below has been found to allow for larger aerosol-generating elements to be formed—for example, in the form of spherical or quasi-spherical beads having larger diameters.

Preferably, in an aerosol-generating element in accordance with the present invention, the solid continuous matrix structure is an alginate polymer matrix and the aerosol-generating element comprises at least about 1 percent by weight of alginate. More preferably, the aerosol-generating element comprises at least about 1.5 percent by weight of alginate. Even more preferably, the aerosol-generating element comprises at least about 2 percent by weight of alginate.

In particularly preferred embodiments, the aerosol-generating element comprises at least about 3 percent by weight of alginate.

Preferably, in an aerosol-generating element in accordance with the present invention, the solid continuous matrix structure is an alginate polymer matrix and the aerosol-generating element comprises less than or equal to about 10 percent by weight of alginate. More preferably, the aerosol-generating element comprises less than or equal to about 8 percent by weight of alginate. Even more preferably, the aerosol-generating element comprises less than or equal to about 6 percent by weight of alginate.

In particularly preferred embodiments, the aerosol-generating element comprises less than or equal to about 5 percent by weight of alginate.

In some embodiments, the solid continuous matrix structure is an alginate polymer matrix and the aerosol-generating element comprises from about 1 percent by weight to about 10 percent by weight of alginate. Preferably, the aerosol-generating element comprises from about 1.5 percent by weight to about 10 percent by weight of alginate, more preferably from about 2 percent by weight to about 10 percent by weight of alginate, even more preferably from about 3 percent by weight to about 10 percent by weight of alginate.

In other embodiments, the solid continuous matrix structure is an alginate polymer matrix and the aerosol-generating element comprises from about 1 percent by weight to about 8 percent by weight of alginate. Preferably, the aerosol-generating element comprises from about 1.5 percent by weight to about 8 percent by weight of alginate, more preferably from about 2 percent by weight to about 18 percent by weight of alginate, even more preferably from about 3 percent by weight to about 8 percent by weight of alginate.

In further embodiments, the solid continuous matrix structure is an alginate polymer matrix and the aerosol-generating element comprises from about 1 percent by weight to about 6 percent by weight of alginate. Preferably, the aerosol-generating element comprises from about 1.5 percent by weight to about 6 percent by weight of alginate, more preferably from about 2 percent by weight to about 6 percent by weight of alginate, even more preferably from about 3 percent by weight to about 6 percent by weight of alginate.

Alternative matrix-forming polymers suitable for use in aerosol-generating elements in accordance with the invention include, but are not limited to, chitosan, fibrin, collagen, gelatin, hyaluronic acid, dextran and combinations thereof.

Further alternative matrix-forming polymers suitable for use in aerosol-generating elements in accordance with the invention may be built from one or more of the following monomers and polymers: hydroxyethylmethacryate (HEMA), N-(2-hydroxy propyl)methacrylate (HPMA), N-vinyl-2-pyrrolidone (NVP), N-isopropylacrylamide (NIPAMM), vinyl acetate (VAc), acrylic acid (AA), methacrylic acid (MAA), polyethylene glycol acrylate/methacrylate (PEGA/PEGMA) and polyethylene glycol diacrylate/dimethacrylate, (PEGDA/PEGDMA).

As defined above, an aerosol-generating element in accordance with the invention comprises a polyhydric alcohol as a component of the aerosol-generating formulation dispersed within the solid continuous matrix structure.

The polyhydric alcohol acts as the aerosol former of the aerosol-generating element. Polyhydric alcohols suitable for use in the aerosol-generating element include, but are not limited to, propylene glycol, triethylene glycol, 1,3-butanediol, and glycerin. Preferably, in an aerosol-generating element in accordance with the invention the polyhydric alcohol is selected from the group consisting of glycerin, propylene glycol, and combinations thereof. In particularly preferred embodiments the polyhydric alcohol is glycerin.

Preferably, the polyhydric alcohol content in the aerosol-generating formulation accounts for at least 30 percent by weight based on the total weight of the aerosol-generating element. Thus, one such aerosol-generating element comprises at least about 30 percent by weight of the polyhydric alcohol.

In some embodiments, the polyhydric alcohol content in the aerosol-generating formulation preferably accounts for at least about 35 percent by weight based on the total weight of the aerosol-generating element. As such, an aerosol-generating element in accordance with the present invention comprises at least about 35 percent by weight of the polyhydric alcohol. More preferably, the polyhydric alcohol content in the aerosol-generating formulation accounts for at least 40 percent by weight based on the total weight of the aerosol-generating element.

In particularly preferred embodiments, the polyhydric alcohol content in the aerosol-generating formulation accounts for at least about 45 percent by weight based on the total weight of the aerosol-generating element. More preferably, the polyhydric alcohol content in the aerosol-generating formulation accounts for at least about 50 percent by weight based on the total weight of the aerosol-generating element. Even more preferably, the polyhydric alcohol content in the aerosol-generating formulation accounts for at least about 55 percent by weight based on the total weight of the aerosol-generating element. Most preferably, the polyhydric alcohol content in the aerosol-generating formulation accounts for at least about 60 percent by weight or at least about 65 percent by weight or at least about 70 percent by weight based on the total weight of the aerosol-generating element.

Typically, in an aerosol-generating element in accordance with the invention the polyhydric alcohol content in the aerosol-generating formulation accounts for less than or equal to about 95 percent by weight based on the total weight of the aerosol-generating element.

Preferably, in an aerosol-generating element in accordance with the invention the polyhydric alcohol content in the aerosol-generating formulation accounts for less than or equal to about 90 percent by weight based on the total weight of the aerosol-generating element. More preferably, the polyhydric alcohol content in the aerosol-generating formulation accounts for less than or equal to about 85 percent by weight based on the total weight of the aerosol-generating element. Even more preferably, the polyhydric alcohol content in the aerosol-generating formulation accounts for less than or equal to about 80 percent by weight based on the total weight of the aerosol-generating element.

In preferred embodiments, the polyhydric alcohol content in the aerosol-generating formulation accounts for from about 30 percent by weight to about 95 percent by weight based on the total weight of the aerosol-generating element. Preferably, the polyhydric alcohol content in the aerosol-generating formulation accounts for from about 35 percent by weight to about 95 percent by weight based on the total weight of the aerosol-generating element. More preferably, the polyhydric alcohol content in the aerosol-generating formulation accounts for from about 40 percent by weight to about 95 percent by weight based on the total weight of the aerosol-generating element. Even more preferably, the polyhydric alcohol content in the aerosol-generating formulation accounts for from about 45 percent by weight to about 95 percent by weight based on the total weight of the aerosol-generating element. In particularly preferred embodiments, the polyhydric alcohol content in the aerosol-generating formulation accounts for from about 50 percent by weight to about 95 percent by weight based on the total weight of the aerosol-generating element, more preferably from about 55 percent by weight to about 95 percent by weight based on the total weight of the aerosol-generating element, even more preferably from about 60 percent by weight to about 95 percent by weight based on the total weight of the aerosol-generating element. Most preferably, the polyhydric alcohol content in the aerosol-generating formulation accounts for from about 65 percent by weight to about 95 percent by weight based on the total weight of the aerosol-generating element or even from about 70 percent by weight to about 95 percent by weight based on the total weight of the aerosol-generating element.

In these embodiments, the aerosol-generating element may comprise from about 30 percent by weight to about 95 percent by weight of polyhydric alcohol. More preferably, the aerosol-generating element comprises from about 35 percent by weight to about 95 percent by weight of polyhydric alcohol. Even more preferably, the aerosol-generating element comprises from about 40 percent by weight to about 95 percent by weight of polyhydric alcohol. Most preferably, the aerosol-generating element comprises from about 45 percent by weight to about 95 percent by weight of polyhydric alcohol. In particularly preferred embodiments, the aerosol-generating element comprises from about 50 percent by weight to about 95 percent by weight of polyhydric alcohol, preferably from about 55 percent by weight to about 95 percent by weight of polyhydric alcohol, more preferably from about 60 percent by weight to about 95 percent by weight of polyhydric alcohol, even more preferably from about 65 percent by weight to about 95 percent by weight of polyhydric alcohol, most preferably from about 70 percent by weight to about 95 percent by weight of polyhydric alcohol.

In other embodiments, the polyhydric alcohol content in the aerosol-generating formulation accounts for from about 30 percent by weight to about 90 percent by weight based on the total weight of the aerosol-generating element. Preferably, the polyhydric alcohol content in the aerosol-generating formulation accounts for from about 35 percent by weight to about 90 percent by weight based on the total weight of the aerosol-generating element. More preferably, the polyhydric alcohol content in the aerosol-generating formulation accounts for from about 40 percent by weight to about 90 percent by weight based on the total weight of the aerosol-generating element. Even more preferably, the polyhydric alcohol content in the aerosol-generating formulation accounts for from about 45 percent by weight to about 90 percent by weight based on the total weight of the aerosol-generating element. In particularly preferred embodiments, the polyhydric alcohol content in the aerosol-generating formulation accounts for from about 50 percent by weight to about 90 percent by weight based on the total weight of the aerosol-generating element, more preferably from about 55 percent by weight to about 90 percent by weight based on the total weight of the aerosol-generating element, even more preferably from about 60 percent by weight to about 90 percent by weight based on the total weight of the aerosol-generating element. In most preferred embodiments, the polyhydric alcohol content in the aerosol-generating formulation accounts for from about 65 percent by weight to about 90 percent by weight or even from about 70 percent by weight to about 90 percent by weight based on the total weight of the aerosol-generating element.

In these embodiments, the aerosol-generating element in accordance with the present invention may comprise from about 30 percent by weight to about 90 percent by weight of a polyhydric alcohol. Preferably, the aerosol-generating element comprises from about 35 percent by weight to about 90 percent by weight of polyhydric alcohol. More preferably, the aerosol-generating element comprises from about 40 percent by weight to about 90 percent by weight of polyhydric alcohol. Even more preferably, the aerosol-generating element comprises from about 45 percent by weight to about 90 percent by weight of polyhydric alcohol. In particularly preferred embodiments, the aerosol-generating element comprises from about 50 percent by weight to about 90 percent by weight of polyhydric alcohol, preferably from about 55 percent by weight to about 90 percent by weight of polyhydric alcohol, more preferably from about 60 percent by weight to about 90 percent by weight of polyhydric alcohol, even more preferably from about 65 percent by weight to about 90 percent by weight of polyhydric alcohol, most preferably from about 70 percent by weight to about 90 percent by weight of polyhydric alcohol.

In further embodiments, the polyhydric alcohol content in the aerosol-generating formulation accounts for from about 30 percent by weight to about 85 percent by weight based on the total weight of the aerosol-generating element. Preferably, the polyhydric alcohol content in the aerosol-generating formulation accounts for from about 35 percent by weight to about 85 percent by weight based on the total weight of the aerosol-generating element. More preferably, the polyhydric alcohol content in the aerosol-generating formulation accounts for from about 40 percent by weight to about 85 percent by weight based on the total weight of the aerosol-generating element. Even more preferably, the polyhydric alcohol content in the aerosol-generating formulation accounts for from about 45 percent by weight to about 85 percent by weight based on the total weight of the aerosol-generating element. In particularly preferred embodiments, the polyhydric alcohol content in the aerosol-generating formulation accounts for from about 50 percent by weight to about 85 percent by weight based on the total weight of the aerosol-generating element, more preferably from about 55 percent by weight to about 85 percent by weight based on the total weight of the aerosol-generating element, even more preferably from about 60 percent by weight to about 85 percent by weight based on the total weight of the aerosol-generating element. In most preferred embodiments, the polyhydric alcohol content in the aerosol-generating formulation accounts for from about 65 percent by weight to about 85 percent by weight or even from about 70 percent by weight to about 85 percent by weight based on the total weight of the aerosol-generating element.

In these embodiments, the aerosol-generating element in accordance with the present invention may comprise from about 30 percent by weight to about 85 percent by weight of a polyhydric alcohol. Preferably, the aerosol-generating element comprises from about 35 percent by weight to about 85 percent by weight of polyhydric alcohol. More preferably, the aerosol-generating element comprises from about 40 percent by weight to about 85 percent by weight of polyhydric alcohol. Even more preferably, the aerosol-generating element comprises from about 45 percent by weight to about 85 percent by weight of polyhydric alcohol. In particularly preferred embodiments, the aerosol-generating element comprises from about 50 percent by weight to about 85 percent by weight of polyhydric alcohol, preferably from about 55 percent by weight to about 85 percent by weight of polyhydric alcohol, more preferably from about 60 percent by weight to about 85 percent by weight of polyhydric alcohol, even more preferably from about 65 percent by weight to about 85 percent by weight of polyhydric alcohol, most preferably from about 70 percent by weight to about 85 percent by weight of polyhydric alcohol.

In yet further embodiments, the polyhydric alcohol content in the aerosol-generating formulation accounts for from about 30 percent by weight to about 80 percent by weight based on the total weight of the aerosol-generating element. Preferably, the polyhydric alcohol content in the aerosol-generating formulation accounts for from about 35 percent by weight to about 80 percent by weight based on the total weight of the aerosol-generating element. More preferably, the polyhydric alcohol content in the aerosol-generating formulation accounts for from about 40 percent by weight to about 80 percent by weight based on the total weight of the aerosol-generating element. Even more preferably, the polyhydric alcohol content in the aerosol-generating formulation accounts for from about 45 percent by weight to about 80 percent by weight based on the total weight of the aerosol-generating element. In particularly preferred embodiments, the polyhydric alcohol content in the aerosol-generating formulation accounts for from about 50 percent by weight to about 80 percent by weight based on the total weight of the aerosol-generating element, more preferably from about 55 percent by weight to about 80 percent by weight based on the total weight of the aerosol-generating element, even more preferably from about 60 percent by weight to about 80 percent by weight based on the total weight of the aerosol-generating element. In most preferred embodiments, the polyhydric alcohol content in the aerosol-generating formulation accounts for from about 65 percent by weight to about 80 percent by weight or even from about 70 percent by weight to about 80 percent by weight based on the total weight of the aerosol-generating element.

In such embodiments, the aerosol-generating element in accordance with the present invention may comprise from about 30 percent by weight to about 80 percent by weight of a polyhydric alcohol. Preferably, the aerosol-generating element comprises from about 35 percent by weight to about 80 percent by weight of polyhydric alcohol. More preferably, the aerosol-generating element comprises from about 40 percent by weight to about 80 percent by weight of polyhydric alcohol. Even more preferably, the aerosol-generating element comprises from about 45 percent by weight to about 80 percent by weight of polyhydric alcohol. In particularly preferred embodiments, the polyhydric alcohol content in the aerosol-generating formulation accounts for from about 50 percent by weight to about 80 percent by weight, preferably from about 55 percent by weight to about 80 percent by weight, more preferably from about 60 percent by weight to about 80 percent by weight, even more preferably from about 65 percent by weight to about 80 percent by weight, most preferably from about 70 percent by weight to about 80 percent by weight based on the total weight of the aerosol-generating element.

As described briefly above, in an aerosol-generating element in accordance with the present invention the aerosol-generating formulation dispersed within the solid continuous matrix structure comprises at least one alkaloid or cannabinoid compound. In some embodiments, the aerosol-generating formulation dispersed within the solid continuous matrix structure comprises both an alkaloid compound and a cannabinoid compound.

As used herein with reference to the invention, the term "alkaloid compound" is used to describe any one of a class of naturally occurring organic compounds that contain one or more basic nitrogen atoms. Generally, an alkaloid contains at least one nitrogen atom in an amine-type structure. This or another nitrogen atom in the molecule of the alkaloid compound can be active as a base in acid-base reactions. Most alkaloid compounds have one or more of their nitrogen atoms as part of a cyclic system, such as for example a heterocylic ring. In nature, alkaloid compounds are found primarily in plants, and are especially common in certain families of flowering plants. However, some alkaloid compounds are found in animal species and fungi. In the context of the present invention, the term "alkaloid compounds" is used to describe both naturally derived alkaloid compounds and synthetically manufactured alkaloid compounds. Suitable alkaloid compounds for use in an aerosol-generating element in accordance with the invention include, but are not limited to, nicotine and anatabine.

As used herein with reference to the invention, the term "cannabinoid compound" is used to describe any one of a class of naturally occurring compounds that are found in parts of the cannabis plant—namely the species *Cannabis sativa*, *Cannabis indica*, and *Cannabis ruderalis*. Cannabinoid compounds are especially concentrated in the female flower heads. Cannabinoid compounds naturally occurring the in cannabis plant include tetrahydrocannabinol (THC) and cannabidiol (CBD). In the context of the present invention, the term "cannabinoid compounds" is used to describe both naturally derived cannabinoid compounds and synthetically manufactured cannabinoid compounds.

Cannabinoid compounds suitable for use in an aerosol-generating film in accordance with the invention include tetrahydrocannabinol (THC), tetrahydrocannabinolic acid (THCA), cannabidiol (CBD), cannabidiolic acid (CBDA), cannabinol (CBN), cannabigerol (CBG), cannabigerol monomethyl ether (CBGM), cannabivarin (CBV), cannabidivarin (CBDV), tetrahydrocannabivarin (THCV), cannabichromene (CBC), cannabicyclol (CBL), cannabichromevarin (CBCV), cannabigerovarin (CBGV), cannabielsoin (CBE), cannabicitran (CBT).

In general, the aerosol-generating element may comprise up to about 10 percent by weight of an alkaloid compound or a cannabinoid compound or both. In view of applications of the aerosol-generating element of the invention as a substrate in an aerosol-generating article, this is advantageous as the content of alkaloid compound or cannabinoid compound or both in the element may be increased and adjusted with a view to optimising the delivery of alkaloid compound or cannabinoid compound or both in aerosol form to a consumer. Compared with existing aerosol-generating substrates based on the use of plant material, this may advantageously allow for higher contents of alkaloid compound or cannabinoid compound or both per volume of substrate (element or elements) or per weight of substrate (element or elements), which may be desirable from a manufacturing viewpoint.

Preferably, the content of the at least one alkaloid or cannabinoid compound in the aerosol-generating formulation dispersed within the solid continuous matrix structure accounts for at least 0.5 percent by weight of a total weight of the aerosol-generating element. Thus, the aerosol-generating element preferably comprises at least about 0.5 percent by weight of an alkaloid compound or at least 0.5 percent by weight of a cannabinoid compound or at least about 0.5 percent by weight of a combination of an alkaloid compound and a cannabinoid compound.

More preferably, the aerosol-generating element comprises at least about 1 percent by weight of an alkaloid compound or a cannabinoid compound or both. Even more preferably, the aerosol-generating element comprises at least about 2 percent by weight of an alkaloid compound or a cannabinoid compound or both.

The aerosol-generating element preferably comprises less than about 8 percent by weight of an alkaloid compound or a cannabinoid compound or both. More preferably, the aerosol-generating element comprises less than about 6 percent by weight of an alkaloid compound or a cannabinoid compound or both. Even more preferably, the aerosol-generating film comprises less than about 5 percent by weight of an alkaloid compound or a cannabinoid compound or both. Most preferably, the aerosol-generating film comprises less than about 4 percent by weight of an alkaloid compound or a cannabinoid compound or both.

In some embodiments, the aerosol-generating element comprises from about 0.5 percent by weight to about 10 percent by weight of an alkaloid compound or a cannabinoid compound or both, more preferably from about 1 percent by weight to about 10 percent by weight of an alkaloid compound or a cannabinoid compound or both, even more preferably from about 2 percent by weight to about 10 percent by weight of an alkaloid compound or a cannabinoid compound or both.

In other embodiments, the aerosol-generating element comprises from about 0.5 percent by weight to about 8 percent by weight of an alkaloid compound or a cannabinoid compound or both, more preferably from about 1 percent by weight to about 8 percent by weight of an alkaloid compound or a cannabinoid compound or both, even more preferably from about 2 percent by weight to about 8 percent by weight of an alkaloid compound or a cannabinoid compound or both.

In further embodiments, the aerosol-generating element comprises from about 0.5 percent by weight to about 6 percent by weight of an alkaloid compound or a cannabinoid compound or both, more preferably from about 1 percent by weight to about 6 percent by weight of an alkaloid compound or a cannabinoid compound or both, even more preferably from about 2 percent by weight to about 6 percent by weight of an alkaloid compound or a cannabinoid compound or both.

In yet further embodiments, the aerosol-generating element comprises from about 0.5 percent by weight to about 5 percent by weight of an alkaloid compound or a cannabinoid compound or both, more preferably from about 1 percent by weight to about 5 percent by weight of an alkaloid compound or a cannabinoid compound or both, even more preferably from about 2 percent by weight to about 5 percent by weight of an alkaloid compound or a cannabinoid compound or both.

In particularly preferred embodiments, the aerosol-generating element comprises from about 0.5 percent by weight to about 4 percent by weight of an alkaloid compound or a cannabinoid compound or both, more preferably from about 1 percent by weight to about 4 percent by weight of an alkaloid compound or a cannabinoid compound or both, even more preferably from about 2 percent by weight to about 4 percent by weight of an alkaloid compound or a cannabinoid compound or both.

In some embodiments, the aerosol-generating element comprises one or more of a cannabinoid and an alkaloid compound comprising nicotine or anatabine. In some preferred embodiments, the aerosol-generating element comprises nicotine.

As used herein with reference to the invention, the term "nicotine" is used to describe nicotine, a nicotine base or a nicotine salt. In embodiments in which the aerosol-generating element comprises a nicotine base or a nicotine salt, the amounts of nicotine recited herein are the amount of free base nicotine or amount of protonated nicotine, respectively.

The aerosol-generating element may comprise natural nicotine or synthetic nicotine.

The aerosol-generating element may comprise one or more monoprotic nicotine salts.

As used herein with reference to the invention, the term "monoprotic nicotine salt" is used to describe a nicotine salt of a monoprotic acid.

In general, the aerosol-generating element may comprise up to about 10 percent by weight of nicotine. In view of applications of the aerosol-generating element of the invention as a substrate in an aerosol-generating article, this is advantageous as the content of nicotine in the film may be increased and adjusted with a view to optimising the delivery of nicotine in aerosol form to a consumer. Compared with existing aerosol-generating substrates based on the use of tobacco plant, this may advantageously allow for higher contents of nicotine per volume of substrate (element or elements) or per weight of substrate (element or elements), which may be desirable from a manufacturing viewpoint.

Preferably, the aerosol-generating element comprises at least about 0.5 percent by weight of nicotine. More preferably, the aerosol-generating element comprises at least about 1 percent by weight of nicotine. Even more preferably, the aerosol-generating element comprises at least about 2 percent by weight of nicotine.

The aerosol-generating element preferably comprises less than or equal to about 8 percent by weight of nicotine. More preferably, the aerosol-generating element comprises less than or equal to about 6 percent by weight of nicotine. Even more preferably, the aerosol-generating element comprises less than or equal to about 5 percent by weight of nicotine. Most preferably, the aerosol-generating element comprises less than or equal to about 4 percent by weight of nicotine.

In some embodiments, the aerosol-generating element comprises from about 0.5 percent by weight to about 10 percent by weight of nicotine, more preferably from about 1 percent by weight to about 10 percent by weight of nicotine, even more preferably from about 2 percent by weight to about 10 percent by weight of nicotine.

In other embodiments, the aerosol-generating element comprises from about 0.5 percent by weight to about 8 percent by weight of nicotine, more preferably from about 1 percent by weight to about 8 percent by weight of nicotine, even more preferably from about 2 percent by weight to about 8 percent by weight of nicotine.

In further embodiments, the aerosol-generating element comprises from about 0.5 percent by weight to about 6 percent by weight of nicotine, more preferably from about 1 percent by weight to about 6 percent by weight of nicotine, even more preferably from about 2 percent by weight to about 6 percent by weight of nicotine.

In yet further embodiments, the aerosol-generating element comprises from about 0.5 percent by weight to about 5 percent by weight of nicotine, more preferably from about 1 percent by weight to about 5 percent by weight of nicotine, even more preferably from about 2 percent by weight to about 5 percent by weight of nicotine.

In particularly preferred embodiments, the aerosol-generating element comprises from about 0.5 percent by weight to about 4 percent by weight of nicotine, more preferably from about 1 percent by weight to about 4 percent by weight of nicotine, even more preferably from about 2 percent by weight to about 4 percent by weight of nicotine.

Preferably, the aerosol-generating element comprises at least about 0.5 milligrams of nicotine. More preferably, the aerosol-generating element comprises at least about 1 milligram of nicotine. Even more preferably, the aerosol-generating element comprises at least about 1.5 milligrams of nicotine. In particularly preferred embodiments, the aerosol-generating element comprises at least about 2 milligrams of nicotine, and most preferably at least about 2.5 milligrams of nicotine.

The aerosol-generating element may comprise up to about 6 milligrams of nicotine. Preferably, the aerosol-generating element comprises less than or equal to about 5 milligrams of nicotine. More preferably, the aerosol-generating element comprises less than or equal to about 4.5 milligrams of nicotine. Even more preferably, the aerosol-generating element comprises less than or equal to about 4 milligrams of nicotine. In particularly preferred embodiments, the aerosol-generating element comprises less than or equal to about 3.5 milligrams of nicotine, and most preferably less than or equal to about 3 milligrams of nicotine.

In some preferred embodiments, the aerosol-generating formulation dispersed within the solid continuous matrix structure of the aerosol-generating element comprises a cannabinoid compound. Preferably, the cannabinoid compound is selected from CBD and THC. More preferably, the cannabinoid compound is CBD.

The aerosol-generating element may comprise up to about 10 percent by weight of CBD. Preferably, the aerosol-generating element comprises at least about 0.5 percent by weight of CBD. More preferably, the aerosol-generating film comprises at least about 1 percent by weight of CBD. Even more preferably, the aerosol-generating film comprises at least about 2 percent by weight of CBD.

The aerosol-generating film preferably comprises less than or equal to about 6 percent by weight of CBD. More preferably, the aerosol-generating film comprises less than or equal to about 5 percent by weight of CBD. Even more preferably, the aerosol-generating film comprises less than or equal to about 4 percent by weight CBD.

In some embodiments, the aerosol-generating element comprises from about 0.5 percent by weight to about 10 percent by weight of CBD, more preferably from about 1 percent by weight to about 10 percent by weight of CBD, even more preferably from about 2 percent by weight to about 10 percent by weight of CBD.

In other embodiments, the aerosol-generating element comprises from about 0.5 percent by weight to about 8 percent by weight of CBD, more preferably from about 1 percent by weight to about 8 percent by weight of CBD, even more preferably from about 2 percent by weight to about 8 percent by weight of CBD.

In further embodiments, the aerosol-generating element comprises from about 0.5 percent by weight to about 6 percent by weight of CBD, more preferably from about 1 percent by weight to about 6 percent by weight of CBD, even more preferably from about 2 percent by weight to about 6 percent by weight of CBD.

In yet further embodiments, the aerosol-generating element comprises from about 0.5 percent by weight to about 5 percent by weight of CBD, more preferably from about 1 percent by weight to about 5 percent by weight of CBD, even more preferably from about 2 percent by weight to about 5 percent by weight of CBD.

In particularly preferred embodiments, the aerosol-generating element comprises from about 0.5 percent by weight to about 4 percent by weight of CBD, more preferably from about 1 percent by weight to about 4 percent by weight of CBD, even more preferably from about 2 percent by weight to about 4 percent by weight of nicotine.

An aerosol-generating element in accordance with the present invention may be a substantially tobacco-free aerosol-generating element.

As used herein with reference to the invention, the term "substantially tobacco-free aerosol-generating element" describes an aerosol-generating element having a tobacco content of less than 1 percent by weight. For example, the aerosol-generating element may have a tobacco content of less than about 0.75 percent by weight, less than about 0.5 percent by weight or less than about 0.25 percent by weight.

The aerosol-generating element may be a tobacco-free aerosol-generating element.

As used herein with reference to the invention, the term "tobacco-free aerosol-generating element" describes an aerosol-generating element having a tobacco content of 0 percent by weight.

In some embodiments, the aerosol-generating element comprises tobacco material or a non-tobacco plant material or a plant extract. By way of example, the aerosol-generating element may comprise tobacco particles, such as tobacco lamina particles, as well as particles of other botanicals, such as clove and *eucalyptus*.

In some embodiments, the aerosol-generating formulation dispersed within the continuous solid matrix structure further comprises an acid. More preferably, the aerosol-generating formulation dispersed within the continuous solid matrix structure comprises one or more organic acids. Even more preferably, the aerosol-generating formulation dispersed within the continuous solid matrix structure comprises one or more carboxylic acids.

Suitable carboxylic acids for use in the aerosol-generating formulation of aerosol-generating elements in accordance with the present invention include, but are not limited to: 2-Ethylbutyric acid, acetic acid, adipic acid, benzoic acid, butyric acid, cinnamic acid, cycloheptane-carboxylic acid, fumaric acid, glycolic acid, hexanoic acid, lactic acid, levulinic acid, malic acid, myristic acid, octanoic acid, oxalic acid, propanoic acid, pyruvic acid, succinic acid, and undecanoic acid.

In particularly preferred embodiments, the acid is lactic acid or levulinic acid or benzoic acid or fumaric acid or acetic acid. Most preferably, the acid is lactic acid.

The inclusion of an acid is especially preferred in embodiments of the aerosol-generating element wherein the aerosol-generating formulation dispersed within the continuous solid matrix structure comprises nicotine, as it has been observed that the presence of an acid may stabilise dissolved species in the aerosol-generating formulation, such as with nicotine and other plant extracts. Without wishing to be bound by theory, it is understood that the acid may interact with the nicotine molecule, such that protonated nicotine is stabilised. As protonated nicotine is non-volatile, it is more easily found in the liquid or particulate phase rather than in the vapour phase of an aerosol obtained by heating the aerosol-generating element. As such, the loss of nicotine during manufacturing of the aerosol-generating element can be minimised, and higher, better controlled nicotine delivery to the consumer can advantageously be ensured.

The aerosol-generating element may comprise up to about 10 percent by weight of an acid.

Preferably, the aerosol-generating element comprises at least about 0.5 percent by weight of an acid. More preferably, the aerosol-generating element comprises at least about 1 percent by weight of an acid. Even more preferably, the aerosol-generating element comprises at least about 2 percent by weight of an acid.

The aerosol-generating element preferably comprises less than or equal to about 8 percent by weight of an acid. More preferably, the aerosol-generating element comprises less than or equal to about 6 percent by weight of an acid. Even more preferably, the aerosol-generating element comprises less than or equal to about 5 percent by weight of an acid. Most preferably, the aerosol-generating element comprises less than or equal to about 4 percent by weight of an acid.

In some embodiments, the aerosol-generating element comprises from about 0.5 percent by weight to about 10 percent by weight of an acid, more preferably from about 1 percent by weight to about 10 percent by weight of an acid, even more preferably from about 2 percent by weight to about 10 percent by weight of an acid.

In other embodiments, the aerosol-generating element comprises from about 0.5 percent by weight to about 8 percent by weight of an acid, more preferably from about 1 percent by weight to about 8 percent by weight of an acid, even more preferably from about 2 percent by weight to about 8 percent by weight of an acid.

In further embodiments, the aerosol-generating element comprises from about 0.5 percent by weight to about 6 percent by weight of an acid, more preferably from about 1 percent by weight to about 6 percent by weight of an acid, even more preferably from about 2 percent by weight to about 6 percent by weight of an acid.

In yet further embodiments, the aerosol-generating element comprises from about 0.5 percent by weight to about 5 percent by weight of an acid, more preferably from about 1 percent by weight to about 5 percent by weight of an acid, even more preferably from about 2 percent by weight to about 5 percent by weight of an acid.

In particularly preferred embodiments, the aerosol-generating element comprises from about 0.5 percent by weight to about 4 percent by weight of an acid, more preferably from about 1 percent by weight to about 4 percent by weight of an acid, even more preferably from about 2 percent by weight to about 4 percent by weight of an acid.

Preferably, where the aerosol-generating solution comprises nicotine, the molar ratio of the acid to nicotine is between about 0.5:1 and about 2:1, more preferably between about 0.75:1 and about 1.5:1, most preferably about 1:1.

Where a multivalent acid is used, such as a multivalent carboxylic acid, it may be preferable to provide a molar ratio of the acid groups to nicotine of between about 0.5:1 and about 2:1, more preferably between about 0.75:1 and about 1.5:1, most preferably about 1:1. The use of a multivalent acid therefore enables a lower weight amount of the acid to be used whilst still providing the same level of protonation of the nicotine. In preferred embodiments, the aerosol-generating element comprises at least about 0.5 percent by weight of levulinic acid. More preferably, the aerosol-generating element comprises at least about 1 percent by weight of levulinic acid. Even more preferably, the aerosol-generating element comprises at least about 2 percent by weight of levulinic acid.

The aerosol-generating element preferably comprises less than or equal to about 8 percent by weight of levulinic acid. More preferably, the aerosol-generating element comprises less than or equal to about 6 percent by weight of levulinic acid. Even more preferably, the aerosol-generating element comprises less than or equal to about 5 percent by weight of levulinic acid. Most preferably, the aerosol-generating element comprises less than or equal to about 4 percent by weight of levulinic acid.

In some embodiments, the aerosol-generating element comprises from about 0.5 percent by weight to about 10 percent by weight of levulinic acid, more preferably from about 1 percent by weight to about 10 percent by weight of levulinic acid, even more preferably from about 2 percent by weight to about 10 percent by weight of levulinic acid.

In other embodiments, the aerosol-generating element comprises from about 0.5 percent by weight to about 8 percent by weight of levulinic acid, more preferably from about 1 percent by weight to about 8 percent by weight of levulinic acid, even more preferably from about 2 percent by weight to about 8 percent by weight of levulinic acid.

In further embodiments, the aerosol-generating element comprises from about 0.5 percent by weight to about 6 percent by weight of levulinic acid, more preferably from about 1 percent by weight to about 6 percent by weight of levulinic acid, even more preferably from about 2 percent by weight to about 6 percent by weight of levulinic acid.

In yet further embodiments, the aerosol-generating element comprises from about 0.5 percent by weight to about 5 percent by weight of levulinic acid, more preferably from about 1 percent by weight to about 5 percent by weight of levulinic acid, even more preferably from about 2 percent by weight to about 5 percent by weight of levulinic acid.

In particularly preferred embodiments, the aerosol-generating element comprises from about 0.5 percent by weight to about 4 percent by weight of levulinic acid, more preferably from about 1 percent by weight to about 4 percent by weight of levulinic acid, even more preferably from about 2 percent by weight to about 4 percent by weight of levulinic acid.

In other preferred embodiments, the aerosol-generating element comprises at least about 0.5 percent by weight of lactic acid. More preferably, the aerosol-generating element comprises at least about 1 percent by weight of lactic acid. Even more preferably, the aerosol-generating element comprises at least about 2 percent by weight of lactic acid.

The aerosol-generating element preferably comprises less than or equal to about 8 percent by weight of lactic acid. More preferably, the aerosol-generating element comprises less than or equal to about 6 percent by weight of lactic acid. Even more preferably, the aerosol-generating element comprises less than or equal to about 5 percent by weight of lactic acid. Most preferably, the aerosol-generating element comprises less than or equal to about 4 percent by weight of lactic acid.

In some embodiments, the aerosol-generating element comprises from about 0.5 percent by weight to about 10 percent by weight of lactic acid, more preferably from about 1 percent by weight to about 10 percent by weight of lactic acid, even more preferably from about 2 percent by weight to about 10 percent by weight of lactic acid.

In other embodiments, the aerosol-generating element comprises from about 0.5 percent by weight to about 8 percent by weight of lactic acid, more preferably from about 1 percent by weight to about 8 percent by weight of lactic acid, even more preferably from about 2 percent by weight to about 8 percent by weight of lactic acid.

In further embodiments, the aerosol-generating element comprises from about 0.5 percent by weight to about 6 percent by weight of lactic acid, more preferably from about 1 percent by weight to about 6 percent by weight of lactic acid, even more preferably from about 2 percent by weight to about 6 percent by weight of lactic acid.

In yet further embodiments, the aerosol-generating element comprises from about 0.5 percent by weight to about 5 percent by weight of lactic acid, more preferably from about 1 percent by weight to about 5 percent by weight of lactic acid, even more preferably from about 2 percent by weight to about 5 percent by weight of lactic acid.

In particularly preferred embodiments, the aerosol-generating element comprises from about 0.5 percent by weight to about 4 percent by weight of lactic acid, more preferably from about 1 percent by weight to about 4 percent by weight of lactic acid, even more preferably from about 2 percent by weight to about 4 percent by weight of lactic acid.

An aerosol-generating element according to the present invention preferably comprises less than or equal to about 25 percent by weight of water.

More preferably, the aerosol-generating element comprises less than or equal to about 20 percent by weight of water. Even more preferably, the aerosol-generating element comprises less than or equal to about 15 percent of water.

An aerosol-generating element according to the present invention preferably comprises at least about 2.5 percent by weight of water. More preferably, the aerosol-generating element according to the present invention preferably comprises at least about 5 percent by weight of water. Even more preferably, the aerosol-generating element according to the present invention preferably comprises at least about 7.5 percent by weight of water. Most preferably, the aerosol-generating element according to the present invention preferably comprises at least about 10 percent by weight of water.

In general, it has been observed that the presence of some water contributes to imparting desirable stability to the aerosol-generating element. At the same time, a residual content of water of 25 percent by weight or less is desirable as an aerosol-generating element may be obtained that is substantially not sticky. Further, when heating an aerosol-generating element with a lower water content, an aerosol more concentrated in the polyhydric alcohol and in the alkaloid or cannabinoid compound, such as nicotine, may be provided to the consumer.

In some embodiments, the aerosol-generating element according to the present invention comprises from about 2.5 percent by weight to about 25 percent by weight of water. Preferably, the aerosol-generating element according to the present invention comprises from about 5 percent by weight to about 25 percent by weight of water. More preferably, the aerosol-generating element according to the present invention comprises from about 7.5 percent by weight to about 25 percent by weight of water. Most preferably, the aerosol-generating element according to the present invention comprises from about 10 percent by weight to about 25 percent by weight of water.

In other embodiments, the aerosol-generating element according to the present invention comprises from about 2.5 percent by weight to about 20 percent by weight of water. Preferably, the aerosol-generating element according to the present invention comprises from about 5 percent by weight to about 20 percent by weight of water. More preferably, the aerosol-generating element according to the present invention comprises from about 7.5 percent by weight to about 20 percent by weight of water. Most preferably, the aerosol-generating element according to the present invention comprises from about 10 percent by weight to about 20 percent by weight of water.

In further embodiments, the aerosol-generating element according to the present invention comprises from about 2.5 percent by weight to about 15 percent by weight of water. Preferably, the aerosol-generating element according to the present invention comprises from about 5 percent by weight to about 15 percent by weight of water. More preferably, the aerosol-generating element according to the present invention comprises from about 7.5 percent by weight to about 15 percent by weight of water. Most preferably, the aerosol-generating element according to the present invention comprises from about 10 percent by weight to about 15 percent by weight of water.

In yet further embodiments, the aerosol-generating element according to the present invention comprises from about 2.5 percent by weight to about 10 percent by weight of water. Preferably, the aerosol-generating element according to the present invention comprises from about 5 percent by weight to about 10 percent by weight of water. More preferably, the aerosol-generating element according to the present invention comprises from about 7.5 percent by weight to about 10 percent by weight of water. Most preferably, the aerosol-generating element according to the present invention comprises from about 10 percent by weight to about 10 percent by weight of water.

An aerosol-generating element according to the present invention preferably has a water activity of less than or equal to about 0.7.

The term "water activity" is used herein with reference to the present invention to denote the ratio of the partial water vapour pressure in equilibrium with an aerosol-generating element to the water-vapour saturation pressure in equilibrium with pure water at the same temperature. As such, water activity is a dimensionless quantity between 0, which corresponds to a completely anhydrous substance, and 1, which corresponds to pure salt-free water. Methods of measuring the water activity of an aerosol-generating element in accordance with the present invention are described in the 2017 publication of ISO 18787 (Foodstuffs—Determination of water activity).

An aerosol-generating element in accordance with the present invention may optionally further comprise a flavourant. The flavourant may be in liquid form, or solid form. Optionally, the flavourant may be provided in a microencapsulated form wherein the flavourant is released upon heating.

Preferably, the aerosol-generating element comprises at least about 0.05 percent by weight of flavourant, more preferably at least about 0.1 percent by weight of flavourant based on the total weight of the aerosol-generating element. The aerosol-generating element preferably comprises less than or equal to about 1 percent by weight of flavourant, more preferably less than or equal to about 0.5 percent by weight of flavourant based on the total weight of the aerosol-generating element.

In some embodiments, the aerosol-generating element comprises from about 0.05 percent by weight to about 1 percent by weight of flavourant, preferably from about 0.05 percent by weight to about 0.5 percent by weight of flavourant based on the total weight of the aerosol-generating element. In other embodiments, the aerosol-generating element comprises from about 0.1 percent by weight to about 1 percent by weight of flavourant, preferably from about 0.1 percent by weight to about 0.5 percent by weight of flavourant based on the total weight of the aerosol-generating element.

Suitable flavourants for use in an aerosol-generating element in accordance with the present invention include, but are not limited to: menthol, mint such as peppermint or spearmint, cocoa, liquorice, fruit (such as citrus), gamma octalactone, vanillin, spices (such as cinnamon), methyl salicylate, linalool, eugenol, eucalyptol, bergamot oil, eugenol oil, geranium oil, lemon oil, ginger oil, and tobacco flavour.

An aerosol-generating element in accordance with the present invention may optionally further comprise a plurality of susceptor particles. Susceptor particles are conductive particles that have the ability to convert electromagnetic energy and convert it to heat. When located in an alternating electromagnetic field, eddy currents are induced and hysteresis losses occur in the susceptor particles causing heating of the susceptor. As the susceptor particles are located in thermal contact or close thermal proximity with the aerosol-generating formulation of the aerosol-generating element, the aerosol-generating formulation is heated by the susceptor particles such that an aerosol is formed.

The inclusion of susceptor particles in the aerosol-generating solution therefore provides an aerosol-generating element that is inductively heatable. When the aerosol-generating element is used in a device comprising an induction heater, changing electromagnetic fields generated by one or several induction coils of an inductive heating device heats the susceptor particles, which then transfer the heat to the surrounding aerosol-generating formulation of the aerosol-generating element, mainly by conduction of heat.

The susceptor particles may be formed from any material that can be inductively heated to a temperature sufficient to generate an aerosol from the aerosol-generating formulation. Preferred susceptor particles comprise a metal or carbon. Preferred susceptor particles may comprise or consist of a ferromagnetic material, for example a ferromagnetic alloy, ferritic iron, or a ferromagnetic steel or stainless steel. Suitable susceptor particles may be, or comprise, aluminium. Preferred susceptor particles may be heated to a temperature in excess of 250 degrees Celsius. Suitable susceptor particles may comprise a non-metallic core with a metal layer disposed on the non-metallic core, for example metallic tracks formed on a surface of a ceramic core. Susceptor particles may have a protective external layer, for example a protective ceramic layer or protective glass layer encapsulating the susceptor particle. The susceptor particles may comprise a protective coating formed by a glass, a ceramic, or an inert metal, formed over a core of susceptor material.

The susceptor particles may have an average particle size up to about 60 micrometres. For example, the susceptor particles may have an average particle size of less than or equal to about 50 micrometres, or less than or equal to about 40 micrometres or less than or equal to about 35 micrometres.

Typically, in an aerosol-generating solution for use in methods in accordance with the present invention the susceptor particles have an average particle size of at least about 1 micrometre, or at least about 2 micrometres, or at least about 5 micrometres or at least about 10 micrometres.

For example, the susceptor particles in the aerosol-generating solution may have an average particle size from about 1 micrometre to about 60 micrometres, or from about 2 millimetres to about 50 micrometres, or from about 5 micrometres to about 40 micrometres, or from about 10 micrometres to about 35 micrometres.

Optionally, the aerosol-generating formulation dispersed within the solid continuous matrix structure of aerosol-generating elements in accordance with the present invention may further comprise a solid filler. The inclusion of a solid filler may advantageously improve the physical properties of the aerosol-generating element. Without wishing to be bound by theory, it is understood that, during manufacture of the aerosol-generating element, inclusion of a solid filler may facilitate control of the properties of the aerosol-generating solution during the step of forming a discrete portion of the aerosol-generating solution. Suitable solid fillers would be known to the skilled person.

For example, an aerosol-generating element in accordance with the present invention may optionally further comprise particles of plant material obtained by pulverising, grinding or comminuting plant material. By way of example, the aerosol-generating element may further comprise tea particles, coffee particles, clove particles, *eucalyptus* particles, star anise particles, ginger particles. Additionally or alternatively, an aerosol-generating element in accordance with the present invention may optionally further comprise particles obtained by pulverising, grinding or comminuting one or more of tobacco leaf lamina and tobacco leaf stems. The inventors of the present invention have found that through the incorporation of such plant particles into the aerosol-generating element it is advantageously possible to produce an aerosol with provides a novel sensory experience. Such an aerosol provides unique flavours and may provide an increased level of mouthfullness.

In embodiments wherein the aerosol-generating element comprises plant particles, the aerosol-generating element may comprise up to about 40 percent by weight of plant particles. Preferably, the aerosol-generating element comprises less than or equal to about 35 percent by weight of plant particles. More preferably, the aerosol-generating element comprises less than or equal to about 30 percent by weight of plant particles. Even more preferably, the aerosol-generating element comprises less than or equal to about 25 percent by weight of plant particles.

In some embodiments, the aerosol-generating element comprises at least about 1 percent by weight of plant particles. Preferably, the aerosol-generating element comprises at least about 2 percent by weight of plant particles. More preferably, the aerosol-generating element comprises at least about 5 percent by weight of plant particles. Even more preferably, the aerosol-generating element comprises at least about 10 percent by weight of plant particles.

In some preferred embodiments, the aerosol-generating element comprises from about 1 percent by weight to about 40 percent by weight of plant particles. Preferably, the aerosol-generating element comprises from about 2 percent by weight to about 40 percent by weight of plant particles. More preferably, the aerosol-generating element comprises from about 5 percent by weight to about 40 percent by weight of plant particles. Even more preferably, the aerosol-generating element comprises from about 10 percent by weight to about 40 percent by weight of plant particles.

In other embodiments, the aerosol-generating element comprises from about 1 percent by weight to about 35 percent by weight of plant particles. Preferably, the aerosol-generating element comprises from about 2 percent by weight to about 35 percent by weight of plant particles. More preferably, the aerosol-generating element comprises from about 5 percent by weight to about 35 percent by weight of plant particles. Even more preferably, the aerosol-generating element comprises from about 10 percent by weight to about 35 percent by weight of plant particles.

In further embodiments, the aerosol-generating element comprises from about 1 percent by weight to about 30 percent by weight of plant particles. Preferably, the aerosol-generating element comprises from about 2 percent by weight to about 30 percent by weight of plant particles. More preferably, the aerosol-generating element comprises from about 5 percent by weight to about 30 percent by weight of plant particles. Even more preferably, the aerosol-generating element comprises from about 10 percent by weight to about 30 percent by weight of plant particles.

In yet further embodiments, the aerosol-generating element comprises from about 1 percent by weight to about 25 percent by weight of plant particles. Preferably, the aerosol-generating element comprises from about 2 percent by weight to about 25 percent by weight of plant particles. More preferably, the aerosol-generating element comprises from about 5 percent by weight to about 25 percent by weight of plant particles. Even more preferably, the aerosol-generating element comprises from about 10 percent by weight to about 25 percent by weight of plant particles.

In embodiments wherein the aerosol-generating element comprises plant particles, the plant particles may have an average particle size up to about 60 micrometres. Preferably, in an aerosol-generating element in accordance with the present invention the plant particles have an average particle size of less than or equal to about 50 micrometres. More preferably, in an aerosol-generating element in accordance with the present invention the plant particles have an average particle size of less than or equal to about 40 micrometres. Even more preferably, in an aerosol-generating element in accordance with the present invention the plant particles have an average particle size of less than or equal to about 30 micrometres.

Typically, in an aerosol-generating element in accordance with the present invention the plant particles have an average particle size of at least about 1 micrometre. Preferably, in an aerosol-generating element in accordance with the present invention the plant particles have an average particle size of at least about 2 micrometres. More preferably, in an aerosol-generating element in accordance with the present invention the plant particles have an average particle size of at least about 5 micrometres. Even more preferably, in an aerosol-generating element in accordance with the present invention the plant particles have an average particle size of at least about 10 micrometres.

In some preferred embodiments, in an aerosol-generating element in accordance with the present invention the plant particles have an average particle size from about 1 millimetre to about 60 micrometres. Preferably, in an aerosol-generating element in accordance with the present invention the plant particles have an average particle size from about 2 millimetres to about 60 micrometres. More preferably, in an aerosol-generating element in accordance with the present invention the plant particles have an average particle size from about 5 millimetres to about 60 micrometres. Even more preferably, in an aerosol-generating element in accordance with the present invention the plant particles have an average particle size from about 10 millimetres to about 60 micrometres.

In other embodiments, in an aerosol-generating element in accordance with the present invention the plant particles have an average particle size from about 1 millimetre to about 50 micrometres. Preferably, in an aerosol-generating element in accordance with the present invention the plant particles have an average particle size from about 2 millimetres to about 50 micrometres. More preferably, in an aerosol-generating element in accordance with the present invention the plant particles have an average particle size from about 5 millimetres to about 50 micrometres. Even more preferably, in an aerosol-generating element in accordance with the present invention the plant particles have an average particle size from about 10 millimetres to about 50 micrometres.

In further embodiments, in an aerosol-generating element in accordance with the present invention the plant particles have an average particle size from about 1 millimetre to about 40 micrometres. Preferably, in an aerosol-generating element in accordance with the present invention the plant particles have an average particle size from about 2 millimetres to about 40 micrometres. More preferably, in an aerosol-generating element in accordance with the present invention the plant particles have an average particle size from about 5 millimetres to about 40 micrometres. Even more preferably, in an aerosol-generating element in accordance with the present invention the plant particles have an average particle size from about 10 millimetres to about 40 micrometres.

In yet further embodiments, in an aerosol-generating element in accordance with the present invention the plant particles have an average particle size from about 1 millimetre to about 30 micrometres. Preferably, in an aerosol-generating element in accordance with the present invention the plant particles have an average particle size from about 2 millimetres to about 30 micrometres. More preferably, in an aerosol-generating element in accordance with the present invention the plant particles have an average particle size from about 5 millimetres to about 30 micrometres. Even more preferably, in an aerosol-generating element in accordance with the present invention the plant particles have an average particle size from about 10 millimetres to about 30 micrometres.

An aerosol-generating element in accordance with the invention may have an equivalent diameter of at least about 0.5 millimetres.

The term "equivalent diameter of an aerosol-generating element" is used herein to denote the diameter of the sphere which has the same volume as the aerosol-generating element. In general, the aerosol-generating element may have any shape, although a spherical or quasi-spherical shape, such as an egg shape or ellipsoid shape is preferred. For an aerosol-generating element having a spherical shape and a circular transverse cross-section, the equivalent diameter is the diameter of the cross-section of the aerosol-generating element.

Preferably, the aerosol-generating element has an equivalent diameter of at least about 1 millimetre. More preferably, the aerosol-generating element has an equivalent diameter of at least about 2 millimetres. Even more preferably, the aerosol-generating element has an equivalent diameter of at least about 3 millimetres.

An aerosol-generating element in accordance with the invention preferably has an equivalent diameter of less than or equal to about 8 millimetres. More preferably, the aerosol-generating element has an equivalent diameter of less than or equal to about 6 millimetres. Even more preferably, the aerosol-generating element has an equivalent diameter of less than or equal to about 5 millimetres.

In some embodiments, the aerosol-generating element has an equivalent diameter from about 0.5 millimetres to about 8 millimetres, preferably from about 1 millimetre to about 8 millimetres, more preferably from about 2 millimetres to about 8 millimetres, even more preferably from about 3 millimetres to about 8 millimetres.

In other embodiments, the aerosol-generating element has an equivalent diameter from about 0.5 millimetres to about 6 millimetres, preferably from about 1 millimetre to about 6 millimetres, more preferably from about 2 millimetres to about 6 millimetres, even more preferably from about 3 millimetres to about 6 millimetres.

In further embodiments, the aerosol-generating element has an equivalent diameter from about 0.5 millimetres to about 5 millimetres, preferably from about 1 millimetre to about 5 millimetres, more preferably from about 2 millimetres to about 5 millimetres, even more preferably from about 3 millimetres to about 5 millimetres.

In particularly preferred embodiments, the aerosol-generating element has an equivalent diameter of about 4 millimetres or about 4.5 millimetres.

Aerosol-generating elements in accordance with the present invention may have an ovality up to about 35 percent.

The term "ovality" as used herein with reference to the present invention denotes the degree of deviation from a perfect circle. Ovality is expressed as a percentage and the mathematical definition is given below.

$$\text{ovality (\%)} = \frac{2(a - b)}{a + b} \times 100\%$$

To determine the ovality of an object, such as an aerosol-generating element, the object can be viewed along a direction substantially perpendicular to a cross-section of the aeroso-generating element. By way of example, the aerosol-generating element can be positioned on a transparent stage so that an image of the aerosol-generating element is recorded by a suitable imaging device located below the stage. Dimension "a" is taken to be the largest external diameter of the image of the aerosol-generating element, and dimension "b" is taken to be the smallest external diameter of the image of the aerosol-generating element. The process is repeated for a total of ten aerosol-generating elements having the same composition and prepared by means of the same process and under the same operating conditions. The number average of the ten ovality measurements is recorded as the ovality for that aerosol-generating element.

Preferably, an aerosol-generating element in accordance with the invention has an ovality of less than or equal to about 30 percent. More preferably, an aerosol-generating element in accordance with the invention has an ovality of less than or equal to about 25 percent. Even more preferably, an aerosol-generating element in accordance with the invention has an ovality of less than or equal to about 20 percent.

An aerosol-generating element in accordance with the invention typically has an ovality of at least about 1 percent. Preferably, the aerosol-generating element has an ovality of at least 2 percent. More preferably, the aerosol-generating element has an ovality of at least 3 percent. Even more preferably, the aerosol-generating element has an ovality of at least 4 percent.

In some embodiments, the aerosol-generating element has an ovality from about 1 percent to about 30 percent, more preferably from about 2 percent to about 30 percent, more preferably from about 3 percent to about 30 percent, even more preferably from about 4 percent to about 30 percent.

In other embodiments, the aerosol-generating element has an ovality from about 1 percent to about 25 percent, more preferably from about 2 percent to about 25 percent, more preferably from about 3 percent to about 25 percent, even more preferably from about 4 percent to about 25 percent.

In further embodiments, the aerosol-generating element has an ovality from about 1 percent to about 20 percent, more preferably from about 2 percent to about 30 percent, more preferably from about 3 percent to about 20 percent, even more preferably from about 4 percent to about 20 percent.

An aerosol-generating article in accordance with the present invention may have an exposed surface area to volume ratio up to 25 $cm^{-1}$.

The expression "exposed surface area to volume ratio" as used herein with reference to the present invention denotes the ratio between the overall outer surface area of the aerosol-generating element, that is exposed and available for heat and mass exchange, and the overall volume of the aerosol-generating element.

As the aerosol-generating elements in accordance with the invention have low ovality and may be assimilated to spherical objects, the volume of an aerosol-generating element in accordance with the invention can be expressed by the formula $$\text{volume} = \frac{4\pi \cdot (R_{eq})^3}{3}$$

The exposed surface area of an aerosol-generating element in accordance with the invention can be estimated by the formula exposed surface area=$4\pi \cdot (R_{eq})^2$ Dimension $R_{eq}$ denotes an equivalent radius of the aerosol-generating element.

Preferably, the aerosol-generating article has an exposed surface area to volume ratio of at least about 0.083 cm$^{-1}$. More preferably, the aerosol-generating article has an exposed surface area to volume ratio of at least about 0.166 cm$^{-1}$. Even more preferably, the aerosol-generating article has an exposed surface area to volume ratio of at least about 0.249 cm$^{-1}$.

The aerosol-generating article preferably has an exposed surface area to volume ratio of less than or equal to about 24 cm$^{-1}$. More preferably, the aerosol-generating article has an exposed surface area to volume ratio of less than or equal to about 20 cm$^{-1}$. Even more preferably, the aerosol-generating article has an exposed surface area to volume ratio of less than or equal to about 16 cm$^{-1}$.

In some embodiment, the aerosol-generating article has an exposed surface area to volume ratio from about 0.083 cm$^{-1}$ to about 24 cm$^{-1}$, more preferably from about 0.166 cm$^{-1}$ to about 24 cm$^{-1}$, even more preferably from about 0.249 cm$^{-1}$ to about 24 cm$^{-1}$.

In other embodiments, the aerosol-generating article has an exposed surface area to volume ratio from about 0.083 cm$^{-1}$ to about 20 cm$^{-1}$, more preferably from about 0.166 cm$^{-1}$ to about 20 cm$^{-1}$, even more preferably from about 0.249 cm$^{-1}$ to about 20 cm$^{-1}$.

In further embodiments, the aerosol-generating article has an exposed surface area to volume ratio from about 0.083 cm$^{-1}$ to about 16 cm$^{-1}$, more preferably from about 0.166 cm$^{-1}$ to about 16 cm$^{-1}$, even more preferably from about 0.249 cm$^{-1}$ to about 16 cm$^{-1}$.

In some embodiments, aerosol-generating elements in accordance with the present invention may be coated. In practice, an outer coating layer may optionally be provided on the aerosol-generating elements as described above. This may be achieved by means of a coating step that may take place before the drying step or after the drying step. An optional drying step may be incorporated after the coating step.

The provision of a coating layer on the aerosol-generating element may be desirable for many different reasons. For example, a coating layer may advantageously limit the permeation of oxygen or water vapour into the aerosol-generating element, which may help to extend the shelf life of the aerosol-generating element. Alternatively or in addition, a coating layer may help to protect the structural integrity of the aerosol-generating element, or to provide improved smoothness of the aerosol-generating element. In certain embodiments, a relatively brittle coating layer may be added to the aerosol-generating element that is adapted to be broken by the consumer prior to use. This type of coating layer can therefore provide the consumer with a tactile and audible indication that the aerosol-generating element has been activated. Alternatively or in addition, the provision of a coating layer on the aerosol-generating element may be used to adjust the colour of the aerosol-generating element, for example, to provide a visual indication of a property of the aerosol-generating element, such as the flavour or the content of nicotine.

Suitable types of coating material would be known to the skilled person. For example, a coating layer of a water soluble film former, such as HPMC or shellac, may be applied to the aerosol-generating element. Such film formers will adhere strongly to the surface of the aerosol-generating element. In a further example, a coating layer of sodium alginate may be added, which will cross-link with any remaining calcium ions on the surface of the aerosol-generating element to form a thin film of calcium alginate.

A coating layer may be applied to the outer surface of the aerosol-generating element using a variety of coating techniques. Suitable apparatus and techniques would be known to the skilled person.

Aerosol-generating elements as described above may find use as aerosol-generating substrate for aerosol-generating articles of the type wherein the substrate is heated to release an inhalable aerosol—as opposed to articles wherein a substrate is burned to produce a smoke.

Because aerosol-generating elements in accordance with the invention are easy to manufacture and predetermined, discrete amounts of an aerosol-generating formulation may thus be provided in encapsulated form, and because the composition of the aerosol-generating formulation—especially as regards the content of polyhydric alcohol and of the alkaloid or cannabinoid compound—can be finely tuned and controlled, aerosol-generating elements in accordance with the invention are versatile and can be used as substrates in a number of arrangements.

By way of example, a plurality of aerosol-generating elements in accordance with the invention may be provided within a cavity defined by a tubular element, such that the outer surface of the aerosol-generating elements is exposed inside the longitudinal airflow channel defined by the cavity. Upon heating, an aerosol can be generated from the aerosol-generating elements, which is thus released into the airflow channel and can be drawn through the tubular element into the consumer's mouth.

Aerosol-generating elements as described above may thus find use in an aerosol-generating system comprising one or more aerosol-generating elements or an aerosol-generating article as described above and an electrically operated aerosol-generating device. A suitable aerosol-generating device comprises a heating element and a heating chamber configured to receive the one or more aerosol-generating elements or the article so that the one or more aerosol-generating element elements are heated in the heating chamber by the heating element.

Upon heating, aerosol-generating elements in accordance with the present invention release an aerosol containing the aerosol-generating formulation components, including in particular the polyhydric alcohol and the alkaloid or cannabinoid compound. When an aerosol-generating element in accordance with the present invention is heated to a temperature in the range from about 150 degrees Celsius to about 350 degrees Celsius, the aerosol-generating element has been found to lose weight without undergoing a significant volume contraction. Further, it has been found that, when an aerosol-generating element in accordance with the present invention is heated to a temperature in the range from about 150 degrees Celsius to about 350 degrees Celsius, and heat is supplied until no additional weight loss is detected, a residual weight of the aerosol-generating element is typically less than 120 percent of a weight of the solid continuous matrix structure components, preferably less than 115 percent of a weight of the solid continuous matrix structure components, more preferably less than 115 percent of a weight of the solid continuous matrix structure components, even more preferably less than 105 percent of a weight of the solid continuous matrix structure components.

Most preferably, when an aerosol-generating element in accordance with the present invention is heated to a temperature in the range from about 150 degrees Celsius to about 350 degrees Celsius, and heat is supplied until no additional weight loss is detected, a residual weight of the aerosol-generating element substantially corresponds to the total weight of the components of the solid continuous matrix structure.

An embodiment of the invention will now be further described, by way of example only.

EXAMPLE

An aerosol-generating solution is formed from a mixture of the following components:

| Component | % by weight |
|---|---|
| Glycerin | 43.6 |
| Sodium alginate | 2.1 |
| Nicotine | 1.2 |
| Levulinic acid | 1.4 |
| Water | 51.7 |

In an initial step, the sodium alginate is added to the water to form a matrix polymer solution. The nicotine is then added, followed by the glycerin and finally the levulinic acid.

The resultant aerosol-generating solution is extruded through a 5 millimetre nozzle to form a plurality of droplets, which are then dropped from a height of 30 centimetres into a cross-linking solution having the following composition, at room temperature:

| Component | % by weight |
|---|---|
| Glycerin | 42.9 |
| Water | 52.1 |
| Calcium chloride | 5.0 |

The droplets are left in the cross-linking solution for a period of 25 minutes before being removed and dried at 25 degrees Celsius for 12 hours, in a tray dryer. The resultant dried aerosol-generating elements are in the form of solid, spherical beads having a diameter of about 4.6 mm. Each bead has a weight of approximately 65 mg, a water activity of 0.4 and the following composition:

| Component | % by weight |
|---|---|
| Glycerin | 76.8 |
| Alginate | 3.8 |
| Nicotine | 2.4 |
| Levulinic acid | 2.1 |
| Water | 14.4 |
| Calcium chloride | 0.5 |

The invention claimed is:

1. An aerosol-generating element for an aerosol-generating article or system, the aerosol-generating element comprising:
   a solid continuous matrix structure; and
   an aerosol-generating formulation dispersed within the solid continuous matrix structure,
   wherein the aerosol-generating formulation is trapped within the solid continuous matrix structure and releasable from the solid continuous matrix structure upon heating of the aerosol-generating element,
   wherein the solid continuous matrix structure consists of an alginate matrix including the alginate as a sole matrix-forming polymer,
   wherein the aerosol-generating formulation dispersed within the solid continuous matrix structure consists of:
      nicotine in an amount accounting for from 1 percent by weight to 4 percent by weight of a total weight of the aerosol-generating element,
      glycerin in an amount accounting for from 60 percent by weight to 80 percent by weight of the total weight of the aerosol-generating element,
      a carboxylic acid in an amount accounting for from 0.5 percent by weight to 4 percent by weight of the total weight of the aerosol-generating element, and
      balance water,
   wherein the aerosol-generating formulation dispersed within the solid continuous matrix structure accounts for at least about 80 percent by weight of a total weight of the aerosol-generating element, and
   wherein the aerosol-generating element comprises less than 15 percent by weight of water.

2. The aerosol-generating element according to claim 1, wherein the aerosol-generating formulation dispersed within the solid continuous matrix structure accounts for at least about 90 percent by weight of the total weight of the aerosol-generating element.

3. The aerosol-generating element according to claim 1, wherein the carboxylic acid is lactic acid or levulinic acid.

4. The aerosol-generating element according to claim 1, further comprising from 2 percent by weight to 6 percent by weight of alginate.

5. The aerosol-generating element according to claim 1, further comprising less than about 10 percent by weight of water.

6. The aerosol-generating element according to claim 1, wherein the aerosol-generating element has an equivalent diameter of at least about 0.5 millimetre.

7. The aerosol-generating element according to claim 1, wherein the aerosol-generating element has an equivalent diameter of less than or equal to about 6 millimetres.

8. The aerosol-generating element according to claim 1, wherein the aerosol-generating element has an ovality from about 2 percent to about 30 percent.

9. The aerosol-generating element according to claim 1, wherein the aerosol-generating element has an exposed surface area to volume ratio from about 0.083 $cm^{-1}$ to about 24 $cm^{-1}$.

* * * * *